United States Patent
Russell et al.

(10) Patent No.: US 11,595,198 B2
(45) Date of Patent: *Feb. 28, 2023

(54) QUANTUM-BASED SECURITY FOR HARDWARE DEVICES

(71) Applicant: Motorola Mobility LLC, Chicago, IL (US)

(72) Inventors: Michael E. Russell, Lake Zurich, IL (US); Jarrett K. Simerson, Northbrook, IL (US)

(73) Assignee: Motorola Mobility LLC, Chicago, IL (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/691,337

(22) Filed: Mar. 10, 2022

(65) Prior Publication Data

US 2022/0294615 A1   Sep. 15, 2022

Related U.S. Application Data

(63) Continuation of application No. 17/202,272, filed on Mar. 15, 2021, now Pat. No. 11,329,811.

(51) Int. Cl.
*H04L 9/08* (2006.01)
*G06F 11/30* (2006.01)
(Continued)

(52) U.S. Cl.
CPC ........ *H04L 9/0852* (2013.01); *G06F 11/3024* (2013.01); *G06F 11/3495* (2013.01);
(Continued)

(58) Field of Classification Search
CPC ..... H04L 9/0852; H04L 9/0869; G06N 21/71; G06F 21/85
See application file for complete search history.

(56) References Cited

U.S. PATENT DOCUMENTS 10,402,172 B1 * 9/2019 Mandich ............... H04L 9/0858
10,630,469 B2   4/2020 Ahn
(Continued)

FOREIGN PATENT DOCUMENTS

EP   3657318 A1   5/2020

OTHER PUBLICATIONS

"Combined Search and Examination Report", GB Application No. GB2203011.8, dated Oct. 11, 2022, 11 pages.
(Continued)

*Primary Examiner* — Viral S Lakhia
(74) *Attorney, Agent, or Firm* — FIG. 1 Patents

(57) ABSTRACT

In aspects of quantum-based security for hardware devices, a computing device includes a processor for application processing in a trusted execution environment, and includes a quantum random number generator to generate quantum random numbers sourced by multiple hardware devices in the computing device. The computing device also includes an embedded secure element that manages connection security of the multiple hardware devices, and is a single root of trust as a secure controller of the quantum random number generator. The computing device also includes a secure switch controlled by the embedded secure element, the secure switch being switchable to connect at least one of the multiple hardware devices to obtain a quantum random number from the quantum random number generator. The secure switch may be a virtualized secure switch implemented in the embedded secure element.

20 Claims, 6 Drawing Sheets

(51) Int. Cl.
  *G06F 21/85* (2013.01)
  *G06F 21/71* (2013.01)
  *G06N 10/00* (2022.01)
  *G06F 11/34* (2006.01)

(52) U.S. Cl.
  CPC .............. *G06F 21/71* (2013.01); *G06F 21/85* (2013.01); *G06N 10/00* (2019.01); *H04L 9/0869* (2013.01)

(56) References Cited

U.S. PATENT DOCUMENTS

| | | | |
|---|---|---|---|
| 11,095,440 B2* | 8/2021 | Islam | H04L 9/0852 |
| 11,095,442 B1* | 8/2021 | Mandich | H04L 9/0662 |
| 11,153,079 B2 | 10/2021 | Sembhi et al. | |
| 11,177,817 B2* | 11/2021 | Park | H03L 7/089 |
| 11,206,131 B1 | 12/2021 | Griffin et al. | |
| 11,212,090 B1* | 12/2021 | Griffin | H04L 63/061 |
| 11,329,811 B1 | 5/2022 | Russell et al. | |
| 11,442,697 B2* | 9/2022 | Huang | H04L 9/0869 |
| 2015/0006601 A1 | 1/2015 | Aissi et al. | |
| 2021/0385064 A1 | 12/2021 | Guo et al. | |
| 2022/0043914 A1 | 2/2022 | Edwards et al. | |
| 2022/0216982 A1* | 7/2022 | McCarty | H04L 9/002 |
| 2022/0353071 A1* | 11/2022 | Jeong | H04L 9/08 |

OTHER PUBLICATIONS

Zhao, Shijun, et al., "Providing Root of Trust for ARM TrustZone using On-Chip SRAM", TrustED '14: Proceedings of the 4th International Workshop on Trustworthy Embedded Devices [retrieved Oct. 19, 2022]. Retrieved from the Internet <https://doi.org/10.1145/2666141.2666145>., Nov. 3, 2014, 13 pages.

"Notice of Allowance", U.S. Appl. No. 17/202,272, dated Mar. 18, 2022, 16 pages.

"Quantis QRNG Chip", ID Quantique SA Product Brochure [online] [retrieved Apr. 15, 2021]. Retrieved from the Internet <https://marketing.idquantique.com/acton/attachment/11868/f-025e/1/-/-/-/-/Quantis%20QRNG%20Chip_Brochure.pdf>., Mar. 27, 2020, 4 pages.

"SKT's Galaxy A71 5G Boasts A Quantum RNG Chip For Advanced Security", Universmartphone.Com Blog [retrieved Apr. 15, 2021]. Retrieved from the Internet <https://www.universmartphone.com/skts-galaxy-a71-5g-boasts-a-quantum-rng-chip-for-advanced-security/>., Apr. 22, 2020, 4 pages.

"What is the Q in QRNG?", ID Quantique SA Website [retrieved Apr. 15, 2021]. Retrieved from the Internet <https://marketing.idquantique.com/acton/attachment/11868/f-0226/1/-/-/-/-/What%20is%20the%20Q%20in%20QRNG_White%20Paper.pdf>., May 2020, 16 pages.

Gras, GAëTAN, et al., "Quantum entropy model of an integrated QRNG chip", arXiv Preprint, Cornell University Website, arXiv.org [retrieved Apr. 15, 2021]. Retrieved from the Internet <https://arxiv.org/pdf/2011.14129.pdf>., Nov. 28, 2020, 6 pages.

Park, Jungmin, et al., "QEC: A Quantum Entropy Chip and Its Applications", IEEE Transactions on Very Large Scale Integration (VLSI) Systems, vol. 28, No. 6 [retrieved Apr. 15, 2021]. Retrieved from the Internet <https://doi.org/10.1109/TVLSI.2020.2975091>., Mar. 12, 2020, 14 pages.

Sanguinetti, Bruno, et al., "Quantum Random Number Generation on a Mobile Phone", Physical Review X, vol. 4 [retrieved Apr. 15, 2021]. Retrieved from the Internet <https://journals.aps.org/prx/pdf/10.1103/PhysRevX.4.031056>., Jul. 2014, 6 pages.

Whitwam, Ryan, et al., "Samsung Announces Phone With 'Quantum' Security Technology", ExtremeTech Blog, Ziff Davis, LLC [retrieved Apr. 15, 2021]. Retrieved from the Internet <https://www.extremetech.com/extreme/310642-samsung-announces-phone-with-quantum-security-technology>., May 15, 2020, 11 pages.

* cited by examiner

QUANTUM-BASED SECURITY FOR HARDWARE DEVICES

RELATED APPLICATION

This application is a continuation of and claims priority to U.S. Patent application Ser. No. 17/202,272 filed Mar. 15, 2021 entitled "Quantum-based Security for Hardware Devices," the disclosure of which is incorporated by reference herein in its entirety.

BACKGROUND

Computing devices utilize random number generators to generate random cryptographic keys for data encryption so that data can be transmitted securely, such as in accordance with Internet encryption protocols. Many conventional devices use random number generation techniques that have a deterministic output, and if the input seed to a random number generator is known, or if enough of the output sequence can be observed, then the output can be determined, which is detrimental when used for cryptographic key generation. In an effort to improve data security in conventional devices that use random number generators, a quantum element is implemented as a quantum random number generator used to generate quantum random numbers for data encryption and security, such as for secure payment and other financial transactions. A truly random number is a number generated by a random process having an outcome that is unpredictable, and which cannot be reliably reproduced. Given that quantum physics is fundamentally random, the use of a quantum process as source of randomness provides an unpredictable output of a quantum random number generator.

Computing devices implement various hardware devices, and current implementations of dedicated embedded secure elements and/or quantum random number generators are not able to combine the advantages of both hardware-based security with the hardware utilized as a root of trust for secure random number generation. Conventional techniques provide one or the other, but not both, due to the current lack of integration in the manufacturing of hardware devices. Given the physical nature of a quantum random number generator as an entropy source, hardware-based security is unlikely to be able to integrate these into a single package, such as integrated in an application processor. The components of a quantum random number generator are not incorporated with an application processor, and the components are not manufactured together. The implementation is difficult for the lower lithography, and given that it is desirable to generate the seed for random number generation from within the most trusted environment, the embedded secure element would have a higher level as a dedicated certified component, which is physically isolated from the subsystems of the application processor.

BRIEF DESCRIPTION OF THE DRAWINGS

Implementations of the techniques for quantum-based security for hardware devices are described with reference to the following Figures. The same numbers may be used throughout to reference like features and components shown in the Figures.

DETAILED DESCRIPTION

Figure 1:
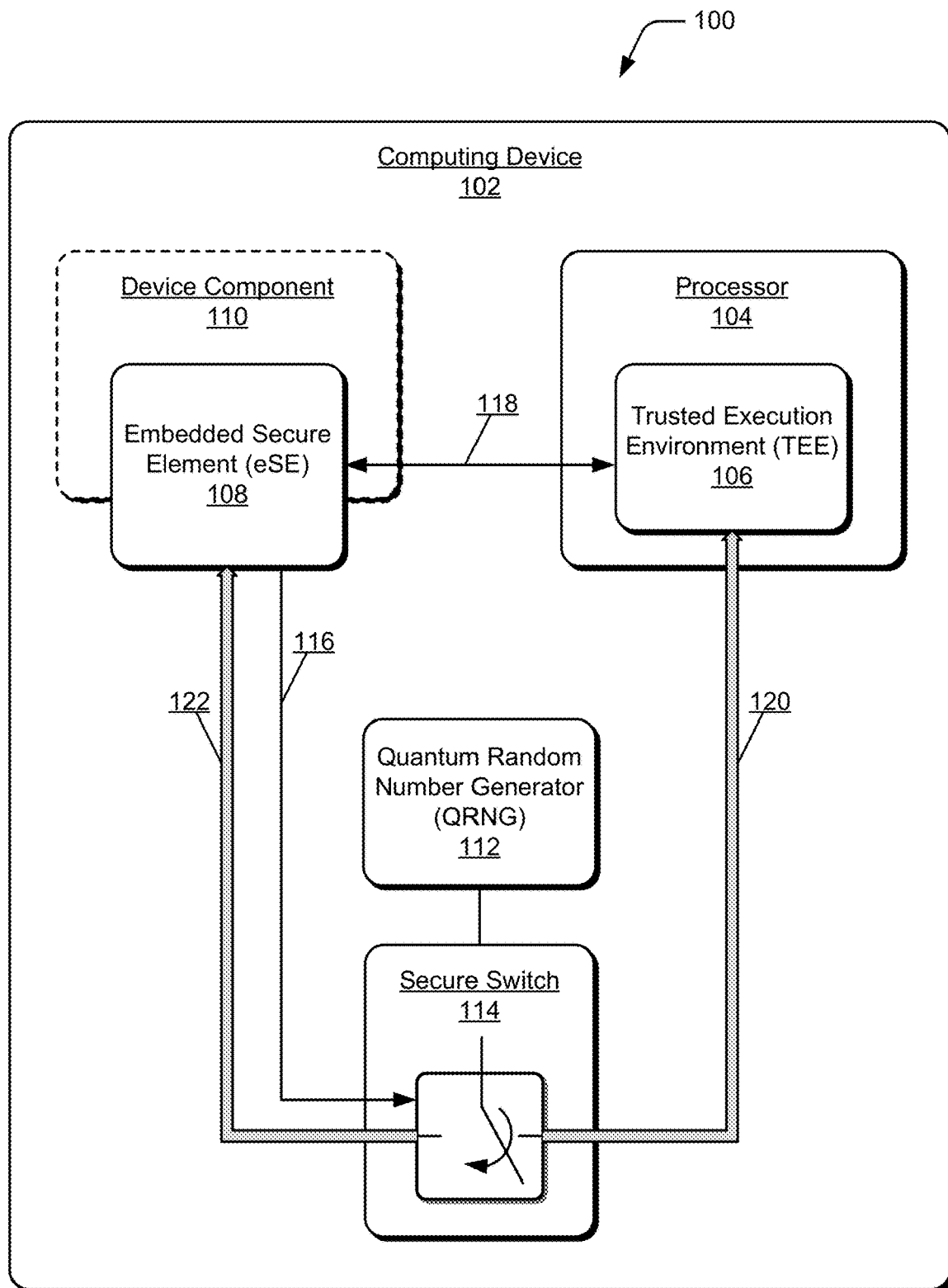
FIG. 1 illustrates an example of quantum-based security for hardware devices in a computing device in accordance with one or more implementations as described herein.

Implementations of quantum-based security for hardware devices are described, and provide techniques that can be implemented by any type of computing devices, such as smart devices, mobile devices (e.g., cellular phones, tablet devices, smartphones), consumer electronics, and the like. Generally, the techniques are implemented for random number generation using a quantum random number generator (QRNG) for quantum secure hardware devices in mobile phones. Notably, a single quantum random number generator can be sourced by multiple hardware devices in a computing device (e.g., a mobile phone), where the hardware devices are tamper-resistant components that include an application processor and an embedded secure element, or an integrated circuit that incorporates the embedded secure element. The single quantum random number generator utilizes the aspect of intrinsic randomness of quantum physics to generate true random numbers for seed generation, such as with hardware that uses light as an entropy source to create random number data, and the randomness of whether emitted photons are reflected or transmitted provides the quantum entropy.

The described techniques for quantum-based security for hardware devices provide for implementations of hardware-based security, such as for embedded secure elements utilized for data encryption and security. A quantum random number generator can be shared and is accessible to multiple secure and nonsecure hardware elements in a device as a shared, single quantum random number generator. For instance, embedded secure elements can be integrated with a near field communication (NFC) controller in a mobile phone for payment transactions, or integrated with an ultra-wideband (UWB) controller used for proximity vehicle entry and/or building access via wireless communication. In implementations, an embedded secure element may be implemented as a stand-alone subscriber identity module (SIM), a standalone or discrete electronic subscriber identity module (eSIM), or can be integrated with SIM/eSIM capabilities, such as for cellular subscriber identity, authentication, carrier billing, roaming, and for other mobile applications. Given that tamper-resistance and secure operating system requirements for secure payment transactions and subscriber authentication are similar, a secure element (or secure computing hardware and/or software) can be used for secure payments, as well as for SIM/eSIM applications.

The described implementations enable all of the hardware devices that rely on secure cryptography in a mobile device to benefit from operating quantum safe. Notably, a mobile phone can be implemented for quantum secure operation at both the framework level (e.g., at the operating system level), and at the application level without the necessity of having to add multiple quantum random number generators. Further, the techniques described herein also provide for health monitoring of the quantum random number generator to ensure tamper resistance.

In aspects of the described techniques, a single quantum random number generator implemented in a computing device can be used with an embedded secure element that is tamper-resistant hardware with an isolated processor (CPU), memory (RAM), and secure storage, along with the trusted execution environment of a microprocessor. In implementations, the quantum random number generator is switched, allowing for different sources of bus control and secure validation with the health monitoring and status of the quantum random number generator output. Although implementation alternatives could utilize multiple, dedicated quantum random number generators, such as one for the embedded secure element, one for the trusted execution environment of the microprocessor, and other components, the multiple quantum random number generators take up extra space on a printed circuit board, when extra space is a premium and limited in smartphone designs, as well as adds extra manufacturing expenses and requires more testing (per QRNG) for security certifications.

The quantum safe techniques described for quantum-based security for hardware devices improves security for the user of a mobile phone by increasing the level of effort that would be required to ascertain the keys of an encryption. This provides for better security for the end user by protecting user information, particularly with the quantity and types of data and information that the typical smartphone user keeps on his or her device. The described quantum safe techniques also enable enhanced use cases for enterprise security, digital key encryption, personal information security, securing credentials, and any other type of enhanced encryption security in quantum infrastructures that enable end-to-end solutions.

In aspects of the described quantum-based security for hardware devices, a computing device, such as a mobile phone, wireless device, smartphone, or other communication device includes a processor for application processing in a trusted execution environment, and includes a quantum random number generator to generate quantum random numbers sourced by multiple hardware devices in the computing device. The computing device also includes an embedded secure element that manages connection security of the multiple hardware devices, and is the single root of trust as a secure controller of the quantum random number generator. The computing device also includes a secure switch controlled by the embedded secure element, with the secure switch being switchable to connect at least one of the multiple hardware devices to obtain a quantum random number from the quantum random number generator. Alternatively, the computing device includes a virtualized secure switch implemented in the embedded secure element, with the virtualized secure switch being switchable to connect at least one of the multiple hardware devices to obtain a quantum random number from the quantum random number generator. The embedded secure element can also monitor entropy source performance associated with generating the quantum random numbers, and determine an operation health status of the quantum random number generator based on the monitored entropy source performance.

In other aspects of the described quantum-based security for hardware devices, a computing device includes a processor for application processing in a trusted execution environment, and includes a quantum random number generator to generate quantum random numbers sourced by multiple hardware devices in the computing device. The computing device also includes a secure switch controlled by an embedded secure element that manages connection security of the multiple hardware devices. The secure switch is switchable to connect at least one of the multiple hardware devices to obtain a quantum random number from the quantum random number generator. The embedded secure element is the single root of trust as a secure controller of the secure switch to manage access to the quantum random number generator by the multiple hardware devices. Additionally, the embedded secure element can also monitor entropy source performance associated with generating the quantum random numbers, and determine an operation health status of the quantum random number generator based on the monitored entropy source performance.

While features and concepts of quantum-based security for hardware devices can be implemented in any number of different devices, systems, environments, and/or configurations, implementations of quantum-based security for hardware devices are described in the context of the following example devices, systems, and methods.

FIG. 1 illustrates an example 100 of techniques for quantum-based security for hardware devices, such as implemented in a computing device 102. In this example 100, the computing device 102 may be any type of a mobile phone, wireless device, smartphone, computing device, tablet device, and/or any other type of device. Generally, the computing device 102 may be any type of an electronic, computing, and/or communication device implemented with various components, such as an application processor and memory, as well as any number and combination of different components as further described with reference to the example device shown in FIG. 6.

In this example 100, the computing device 102 includes a processor 104 for application processing in a trusted execution environment (TEE) 106, such as any type of a microprocessor, controller, application processor, and the like. Generally, the trusted execution environment 106 is a secure area of the processor that provides an isolated execution environment for a higher level of security, and isolated execution and integrity of trusted applications running on the computing device.

The computing device 102 also includes an embedded secure element (eSE) 108, which is a tamper-resistant hardware device, such as a smart card chip that includes its own integrated processor (CPU), memory (e.g., ROM, EEPROM, RAM), and an I/O port for tamper-proof connectivity and data communication with other hardware devices implemented in the computing device 102. In implementations, the embedded secure element 108 may be a standalone element used in a mobile phone, such as for secure payment and financial transactions, for transit applications, and in secure location access environments. As a standalone element, the embedded secure element 108 can include SIM/eSIM capabilities. Notably, the tamper-resistant hardware, memory, and secure operating system functions can be used for secure payment transactions, such as in an NFC device, or for subscriber authentication, such as in a SIM card. The same higher-level secure functions can be used for secure payment transactions or for SIM/eSIM applications.

In other implementations, the embedded secure element 108 may be incorporated as a secure element of an integrated circuit and/or another device component 110 of the computing device. For example, the computing device 102 may implement other hardware devices, such as a near field communication (NFC) controller to facilitate mobile payment transactions and other short-range communications between compatible devices, or an ultra-wideband (UWB) controller to facilitate proximity vehicle entry and/or building access via wireless communications from a mobile phone. In implementations, the embedded secure element 108 may be integrated with SIM/eSIM capabilities, such as for cellular subscriber identity, authentication, carrier billing, roaming, and for other mobile applications. Given that tamper-resistance and secure operating system requirements for secure payment transactions and subscriber authentication are similar, a secure element (or secure computing hardware and/or software) can be used for secure payments, as well as for SIM/eSIM applications.

The computing device 102 also includes a quantum random number generator (QRNG) 112 which generates quantum random numbers sourced by any of the multiple hardware devices in the computing device. For example, the multiple hardware devices are tamper-resistant components of the computing device that include the processor 104 and the embedded secure element 108, or an integrated circuit or other device component 110 that incorporates the embedded secure element. In this example 100, the quantum random number generator 112 is designed for implementation in smaller, mobile devices such as smartphones, having a smaller form factor and a low power consumption.

The quantum random number generator 112 can be shared and is accessible to the multiple secure and nonsecure hardware devices in the computing device 102 as a shared, single quantum random number generator. In an example implementation, the quantum random number generator 112 can include one or more light-emitting diodes (LEDs), a CMOS image sensor, and an analog-to-digital converter. A light field is emitted by the LED, and the emitted photons are converted into electrons by the CMOS image sensor. The electrons are converted into random voltage value distributions and then digitized by the analog-to-digital converter, from which entropy bits are generated as an entropy source of the quantum random number generator based on the quantum fluctuations of the photon number emitted by the light-emitting diodes.

In aspects of the described quantum safe techniques, the computing device 102 includes a secure switch 114, which is controlled by the embedded secure element 108 via a secure IO control bus 116. The secure switch 114 is switchable to connect any one of the multiple hardware devices to obtain a quantum random number from the quantum random number generator 112. The embedded secure element 108 is the single root of trust as a secure controller of the secure switch 114 to manage access to the quantum random number generator 112 by the multiple hardware devices of the computing device 102. Notably, the embedded secure element 108, as the ultimate root of trust, is the most trusted entity in the system and securely controls the secure switch 114.

The embedded secure element 108 manages and controls when the processor 104 or any of the other device components 110 can access the quantum random number generator 112 by having control and ownership over the secure switch 114. If the embedded secure element 108 needs to utilize the quantum random number generator 112, the embedded secure element can ensure that it has access, and the access cannot be corrupted.

The trusted execution environment 106 of the processor 104 and the embedded secure element 108 can communicate requests and acknowledgements via a data messaging bus 118. For example, the trusted execution environment 106 can request a stream of quantum random numbers, and the embedded secure element 108 can initiate to connect the secure switch 114 to the trusted execution environment via the secure IO control bus 116. The trusted execution environment 106 then receives the quantum random numbers that are generated by the quantum random number generator 112 via a secure data bus 120 that connects the trusted execution environment 106 to the secure switch. Similarly, the embedded secure element 108 can initiate to connect the secure switch 114 to the device component 110 via the secure IO control bus 116. The device component 110 then receives the quantum random numbers that are generated by the quantum random number generator 112 via a secure data bus 122 that connects the device component 110 to the secure switch.

Figure 2:
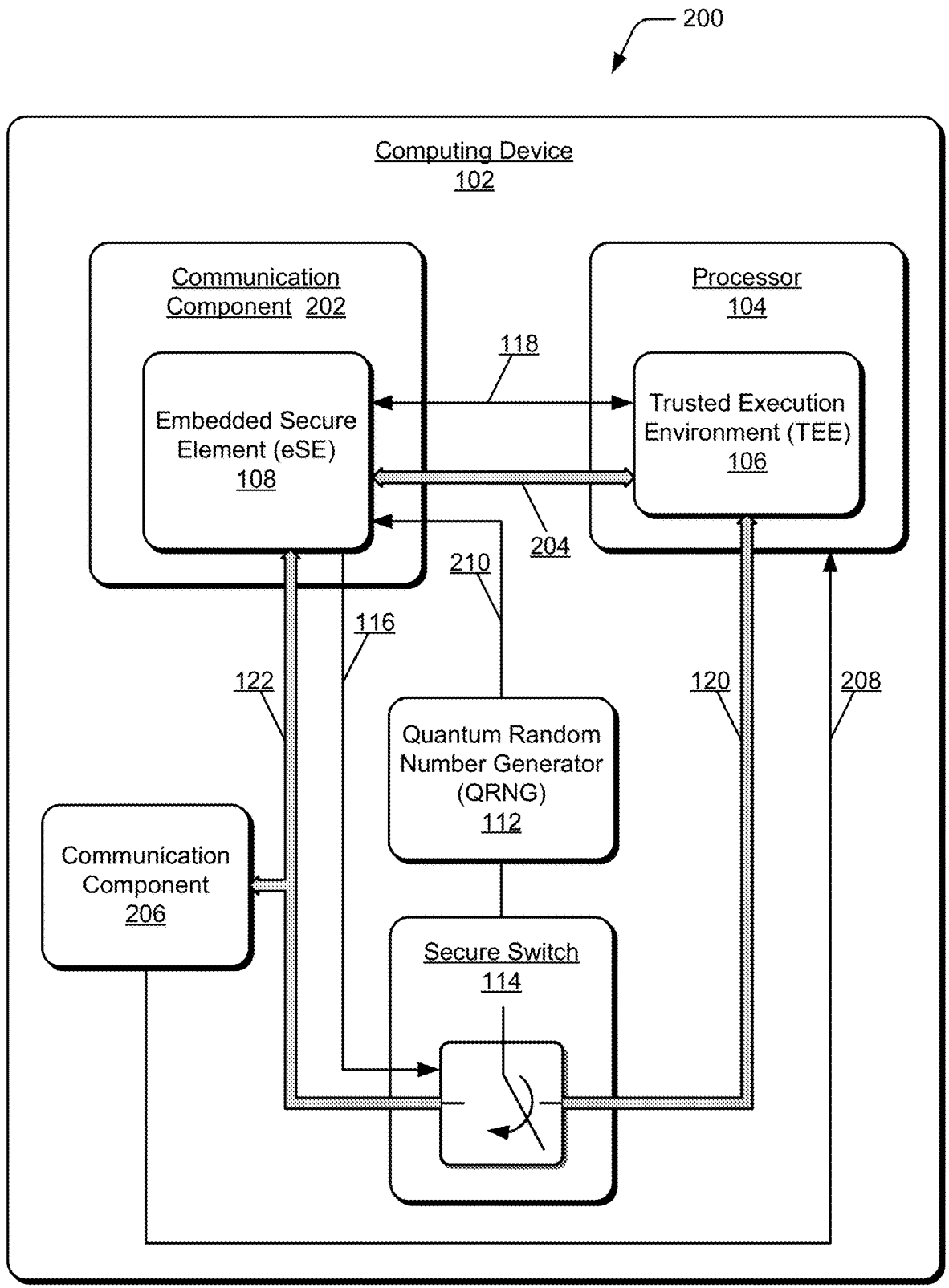
FIG. 2 further illustrates the example of quantum-based security for hardware devices in a computing device in accordance with one or more implementations as described herein.

FIG. 2 further illustrates an example 200 of features for quantum-based security for hardware devices, such as implemented in the computing device 102 as shown and described with reference to FIG. 1. As shown in this example 200, the computing device 102 includes the processor 104 for application processing with the trusted execution environment 106, as well as the quantum random number generator 112 and the secure switch 114. The embedded secure element 108 is implemented as an integrated element of a communication component 202, such as a near field communication (NFC) controller, which incorporates a secure architecture for contactless card access. The secure architecture of the NFC controller includes a secure data bus 204 between the trusted execution environment 106 on the device processor 104 and the embedded secure element 108 on the NFC controller.

The computing device 102 also includes another communication component 206 in this example 200, such as an ultra-wideband (UWB) controller, a stand-alone subscriber identity module (SIM), or a stand-alone electronic subscriber identity module (eSIM). The secure data bus 122 can be implemented as an I²C interface or any type of SIM IO bus that is addressable and usable to connect multiple devices. Notably, the secure data bus 122 facilitates multiple hardware devices, such as the communication components 202, 206 being connected to the secure switch 114 via which quantum random numbers can be received as generated by the quantum random number generator 112. The computing device 102 may also be implemented with additional communication interfaces between device components, such as any type of an I²C interface, a serial peripheral interface (SPI) bus, an ISO interface, or any type of SIM IO bus for data communication between a UWB controller, the processor 104, and/or a SIM/eSIM in the device. For instance, a data communication bus 208 is implemented between the communication component 206 and the processor 104 for data messaging and communication.

Notably, the embedded secure element 108 controls the secure switch 114 via the secure IO control bus 116, and as the single root of trust of the secure switch, the embedded secure element 108 manages access to the quantum random number generator 112 by the communication components 202, 206 and the trusted execution environment 106 of the device processor 104. In aspects of the described quantum safe techniques, the embedded secure element 108 also monitors the entropy source performance associated with generating the quantum random numbers, and can determine an operation health status of the quantum random number generator 112 based on the monitored entropy source performance.

In implementations, data bus control and health checks are performed by the most trusted environment, which is the embedded secure element 108 that receives health data from the quantum random number generator 112 via a secure health IO data bus 210. The embedded secure element 108 determines the operation health status of the quantum random number generator 112 to ensure that the integrity of the quantum safe system is maintained, the distribution of the generated quantum random numbers is within health bounds, and ensuring the entropy is correct so that cryptographic keys can be flagged for errors and invalidated if the system has been tampered with. If the operation health status of the quantum random number generator 112 falls outside of expected bounds, the embedded secure element 108 can control the secure switch 114 via the secure IO control bus 116, such as to interrupt a stream of quantum random numbers that are being generated and communicated to the trusted execution environment 106 of the processor 104 via the secure data bus 120.

Figure 3:
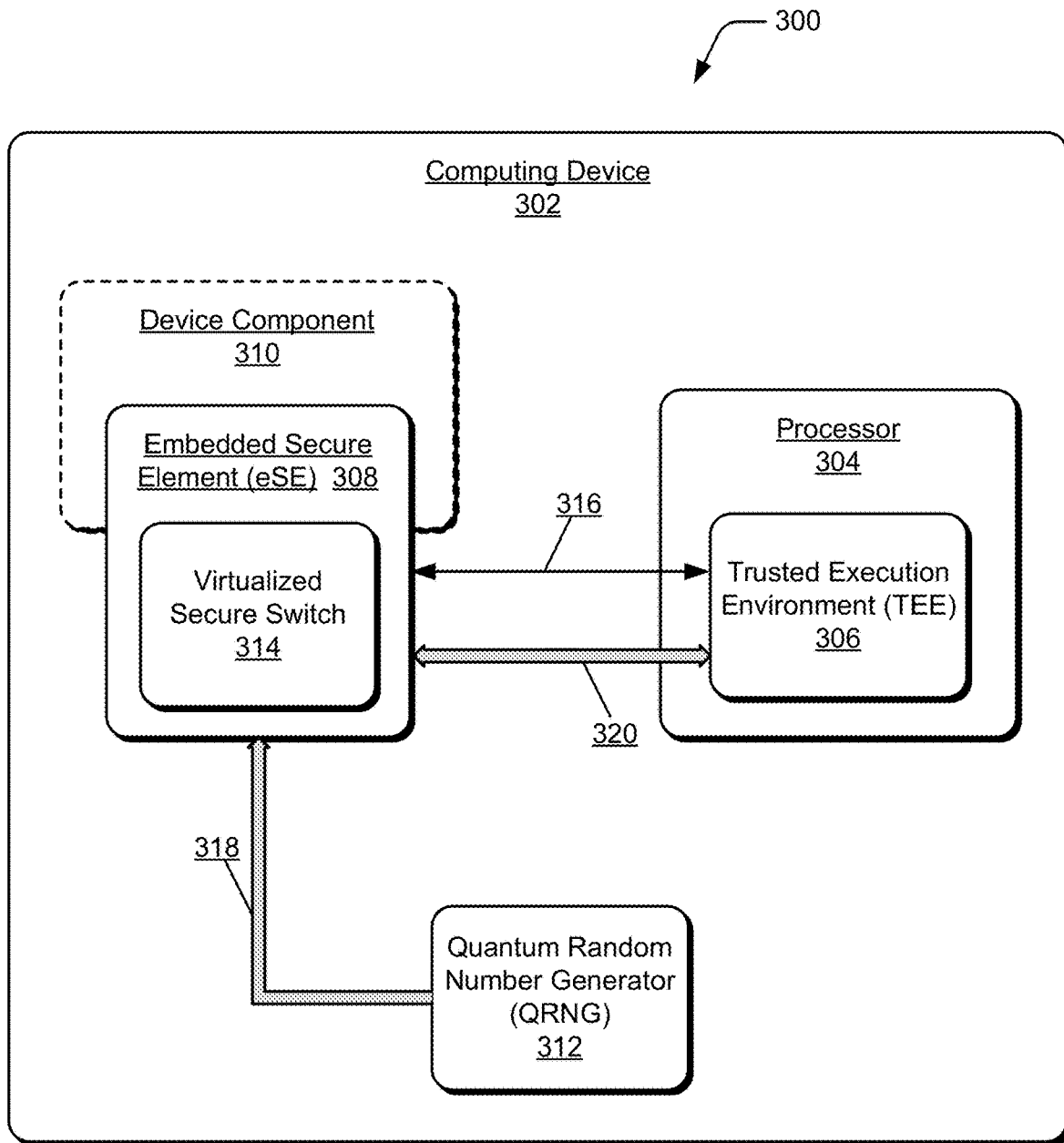
FIG. 3 illustrates another example of quantum-based security for hardware devices in a computing device in accordance with one or more implementations as described herein.

FIG. 3 illustrates another example 300 of techniques for quantum-based security for hardware devices, such as implemented in a computing device 302. In this example 300, the computing device 302 may be any type of a mobile phone, wireless device, smartphone, computing device, tablet device, and/or any other type of device. Generally, the computing device 302 may be any type of an electronic, computing, and/or communication device implemented with various components, such as an application processor and memory, as well as any number and combination of different components as further described with reference to the example device shown in FIG. 6.

In this example 300, the computing device 302 includes a processor 304 for application processing in a trusted execution environment (TEE) 306, such as any type of a microprocessor, controller, application processor, and the like. Generally, the trusted execution environment 306 is a secure area of the processor that provides an isolated execution environment for a higher level of security, and isolated execution and integrity of trusted applications running on the computing device.

The computing device 302 also includes an embedded secure element (eSE) 308, which is a tamper-resistant hardware device, such as a smart card chip that includes its own integrated processor (CPU), memory (e.g., ROM, EEPROM, RAM), and an I/O port for tamper-proof connectivity and data communication with other hardware devices implemented in the computing device 302. In implementations, the embedded secure element 308 may be a standalone element used in a mobile phone, such as for secure payment and financial transactions, for transit applications, and in secure location access environments. As a standalone element, the embedded secure element 308 can include SIM/eSIM capabilities. Notably, the tamper-resistant hardware, memory, and secure operating system functions can be used for secure payment transactions, such as in an NFC device, or for subscriber authentication, such as in a SIM card. The same higher-level secure functions can be used for secure payment transactions or for SIM/eSIM applications.

In other implementations, the embedded secure element 308 may be incorporated as a secure element of an integrated circuit and/or another device component 310 of the computing device. For example, the computing device 302 may implement other hardware devices, such as a near field communication (NFC) controller to facilitate mobile payment transactions and other short-range communications between compatible devices, or an ultra-wideband (UWB) controller to facilitate proximity vehicle entry and/or building access via wireless communications from a mobile phone. In implementations, the embedded secure element 108 may be integrated with SIM/eSIM capabilities, such as for cellular subscriber identity, authentication, carrier billing, roaming, and for other mobile applications. Given that tamper-resistance and secure operating system requirements for secure payment transactions and subscriber authentication are similar, a secure element (or secure computing hardware and/or software) can be used for secure payments, as well as for SIM/eSIM applications.

The computing device 302 also includes a quantum random number generator (QRNG) 312 which generates quantum random numbers sourced by any of the multiple hardware devices in the computing device. For example, the multiple hardware devices are tamper-resistant components of the computing device that include the processor 304 and the embedded secure element 308, or an integrated circuit or other device component 310 that incorporates the embedded secure element. The quantum random number generator 312 can be shared and is accessible to the multiple secure and nonsecure hardware devices in the computing device 302 as a shared, single quantum random number generator, and may be implemented as described with reference to the quantum random number generator 112, as shown and described with reference to FIGS. 1 and 2.

In aspects of the described quantum safe techniques, the embedded secure element 308 implements a virtualized secure switch 314, which is controlled by the embedded secure element and is switchable to provide any one of the multiple hardware devices a quantum random number from the quantum random number generator 312. As described above, the embedded secure element 308 is the single root of trust as a secure controller of the virtualized secure switch 314 to manage access to the quantum random number generator 312 by the multiple hardware devices of the computing device 302. In this implementation, the quantum random number generator 312 is switched and the output is passed through the embedded secure element 308, which manages and controls when the processor 304 or any of the other device components 310 can access the quantum random number generator 312 by having control and ownership over the virtualized secure switch 314.

The trusted execution environment 306 of the processor 304 and the embedded secure element 308 can communicate requests and acknowledgements via a data messaging bus 316. For example, the trusted execution environment 306 can request a quantum random number, and the embedded secure element 308 can then obtain the requested quantum random number from the quantum random number generator 312 via a secure data bus 318. The embedded secure element 308 receives the quantum random number from the quantum random number generator 312, and routes by way of the virtualized secure switch 314, the requested quantum random number to the trusted execution environment 306 of the processor 304 via a secure data bus 320. Similarly, the embedded secure element 308 can initiate to route a quantum random number by way of the virtualized secure switch 314 to the device component 310, as received from the quantum random number generator 312 via the secure data bus 318.

Figure 4:
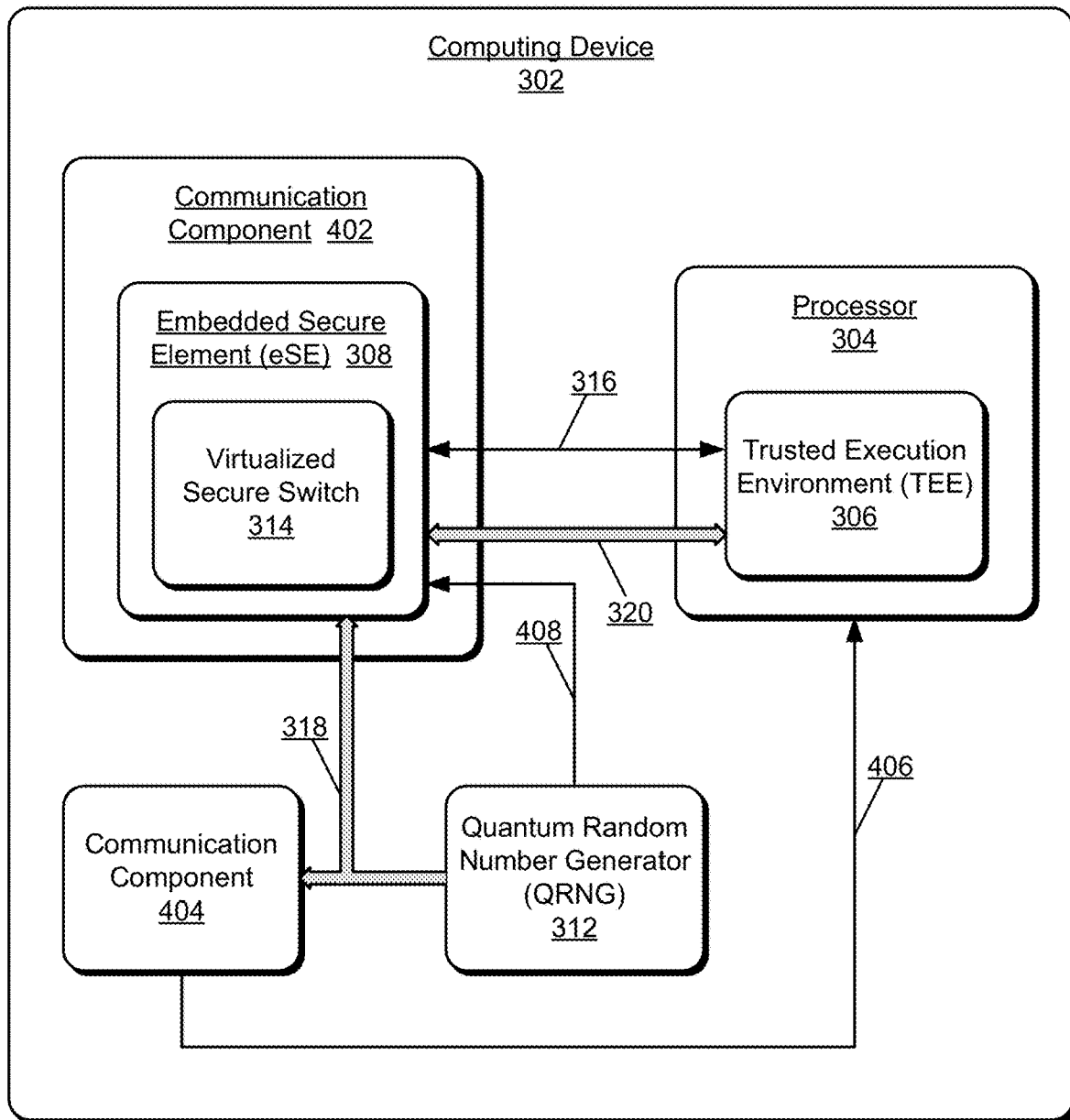
FIG. 4 further illustrates the example of quantum-based security for hardware devices in a computing device in accordance with one or more implementations as described herein.

FIG. 4 further illustrates an example 400 of features for quantum-based security for hardware devices, such as implemented in the computing device 302 as shown and described with reference to FIG. 3. As shown in this example 400, the computing device 302 includes the processor 304 for application processing with the trusted execution environment 306, as well as the quantum random number generator 312. The embedded secure element 308 includes the virtualized secure switch 314 and is implemented as an integrated element of a communication component 402, such as a near field communication (NFC) controller, which incorporates a secure architecture that includes the secure data bus 320 between the trusted execution environment 306 on the device processor 304 and the embedded secure element 308 on the NFC controller.

The computing device 302 also includes another communication component 404 in this example 400, such as an ultra-wideband (UWB) controller, a stand-alone subscriber identity module (SIM), or a stand-alone electronic subscriber identity module (eSIM). The secure data bus 318 can be implemented as an I²C interface or any type of SIM IO bus that is addressable and usable to connect multiple devices. Notably, the secure data bus 318 facilitates multiple hardware devices, such as the communication components 402, 404 being connected through the embedded secure element 308 that controls the virtualized secure switch 314 to route the quantum random numbers received as generated from the quantum random number generator 312. The computing device 302 may also be implemented with additional communication interfaces between device components, such as any type of an I²C interface, a serial peripheral interface (SPI) bus, an ISO interface, or any type of SIM IO bus for data communication between a UWB controller, the processor 304, and/or a SIM/eSIM in the device. For instance, a data communication bus 406 is implemented between the communication component 404 and the processor 304 for data messaging and communication.

Notably, the embedded secure element 308 controls the virtualized secure switch 314, and as the single root of trust of the virtualized secure switch, the embedded secure element 308 manages access to the quantum random number generator 312 by the communication components 402, 404 and the trusted execution environment 306 of the device processor 304. In aspects of the described quantum safe techniques, the embedded secure element 308 also monitors the entropy source performance associated with generating the quantum random numbers, and can determine an operation health status of the quantum random number generator 312 based on the monitored entropy source performance.

In implementations, data bus control and health checks are performed by the most trusted environment, which is the embedded secure element 308 that receives health data from the quantum random number generator 312 via a secure health IO data bus 408. The embedded secure element 308 determines the operation health status of the quantum random number generator 312 to ensure that the integrity of the quantum safe system is maintained, the distribution of the generated quantum random numbers is within health bounds, and ensuring the entropy is correct so that cryptographic keys can be flagged for errors and invalidated if the system has been tampered with. If the operation health status of the quantum random number generator 312 falls outside of expected bounds, the embedded secure element 308 can control the virtualized secure switch 314, such as to interrupt a stream of quantum random numbers that are being generated and communicated to the trusted execution environment 306 of the processor 304 via the secure data buses 318, 320.

Example method 500 is described with reference to FIG. 5 in accordance with implementations of quantum-based security for hardware devices. Generally, any services, components, modules, methods, and/or operations described herein can be implemented using software, firmware, hardware (e.g., fixed logic circuitry), manual processing, or any combination thereof. Some operations of the example methods may be described in the general context of executable instructions stored on computer-readable storage memory that is local and/or remote to a computer processing system, and implementations can include software applications, programs, functions, and the like. Alternatively or in addition, any of the functionality described herein can be performed, at least in part, by one or more hardware logic components, such as, and without limitation, Field-programmable Gate Arrays (FPGAs), Application-specific Integrated Circuits (ASICs), Application-specific Standard Products (ASSPs), System-on-a-chip systems (SoCs), Complex Programmable Logic Devices (CPLDs), and the like.

Figure 5:
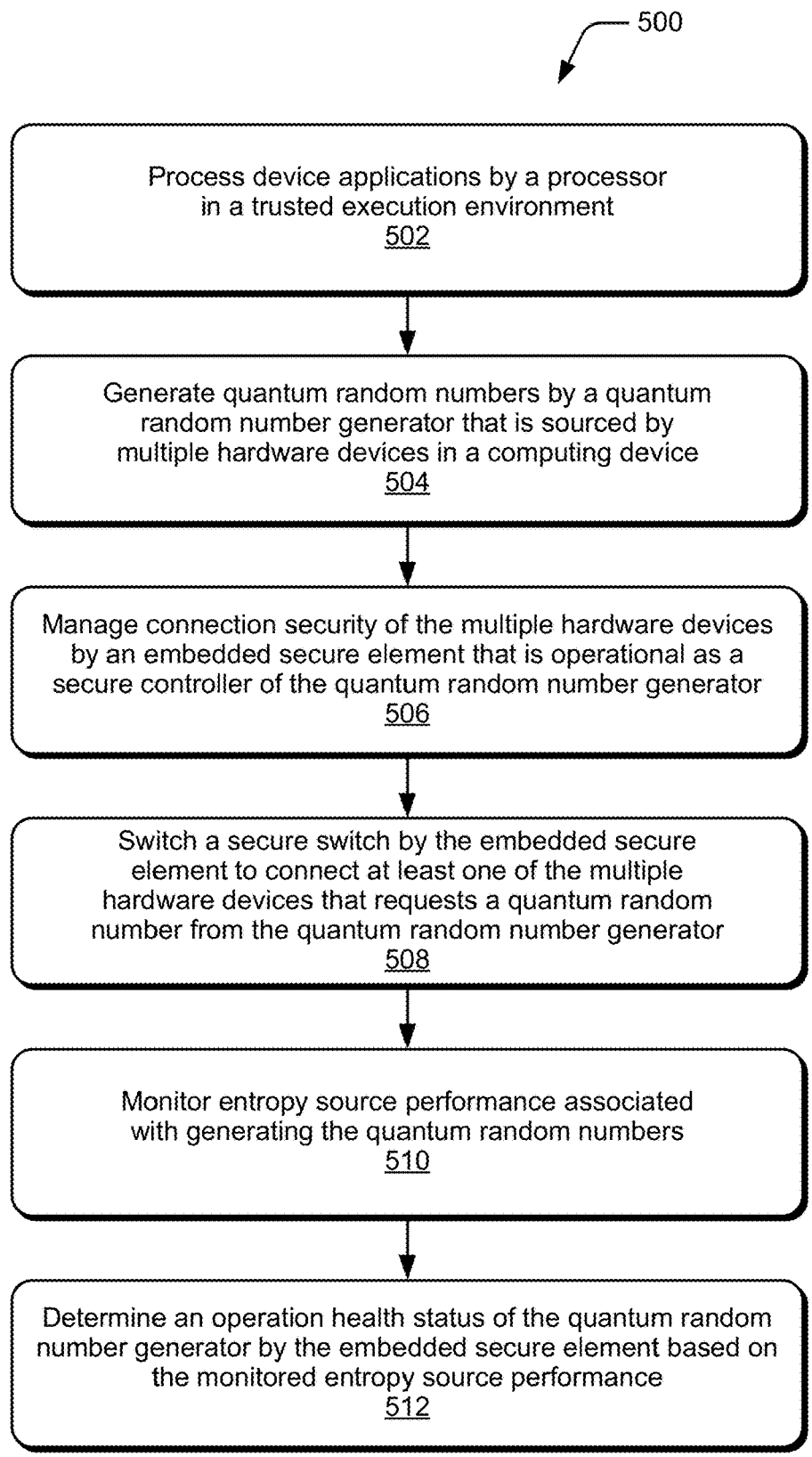
FIG. 5 illustrates example method(s) of quantum-based security for hardware devices in accordance with one or more implementations of the techniques described herein.

FIG. 5 illustrates example method(s) 500 of quantum-based security for hardware devices, and is generally described with reference to a computing device. The order in which the method is described is not intended to be construed as a limitation, and any number or combination of the described method operations can be performed in any order to perform a method, or an alternate method.

At 502, device applications are processed by a processor in a trusted execution environment. For example, the computing device 102 includes the device processor 104 for application processing in the trusted execution environment 106, such as any type of a microprocessor, controller, application processor, and the like. Similarly, the computing device 302 includes the device processor 304 for application processing in the trusted execution environment 306.

At 504, quantum random numbers are generated by a quantum random number generator that is sourced by multiple hardware devices in a computing device. For example, the quantum random number generator 112 generates quantum random numbers for any number of the hardware devices in the computing device 102. The hardware devices are tamper-resistant components in the computing device 102 that source quantum random numbers from the quantum random number generator 112, and these hardware devices include the processor 104, the embedded secure element 108, and/or any other hardware devices, such as a communication component 202 that integrates the embedded secure element 108. For instance, the computing device 102 may include other hardware devices, such as a near field communication (NFC) controller, an ultra-wideband (UWB) controller, a stand-alone subscriber identity module (SIM), a stand-alone electronic subscriber identity module (eSIM), and/or a secure element integrated with SIM/eSIM capabilities. Similarly, the quantum random number generator 312 generates quantum random numbers for any number of the hardware devices in the computing device 302.

At 506, connection security of the multiple hardware devices is managed by an embedded secure element that is operational as a secure controller of the quantum random number generator. For example, the embedded secure element 108 manages the connection security of the hardware devices that are the tamper-resistant components in the computing device 102. Notably, the embedded secure element 108 is the single root of trust as the secure controller of the secure switch 114 to manage access to the quantum random number generator 112 by the multiple hardware devices in the computing device. Similarly, the embedded secure element 308 is the single root of trust as a secure controller of the virtualized secure switch 314 to manage access to the quantum random number generator 312 by the multiple hardware devices of the computing device 302.

At 508, a secure switch is switched by the embedded secure element to connect at least one of the multiple hardware devices that requests a quantum random number from the quantum random number generator. For example, the embedded secure element 108 controls the secure switch 114 in the computing device 102 via the secure IO control bus 116 to connect any one of the hardware devices that requests a quantum random number from the quantum random number generator 112. Similarly, the embedded secure element 308 in computing device 302 implements the virtualized secure switch 314, which is controlled by the embedded secure element 308 and is switchable to provide any one of the multiple hardware devices a quantum random number from the quantum random number generator 312.

At 510, entropy source performance associated with generating the quantum random numbers is monitored. For example, the embedded secure element 108 implemented in the computing device 102 receives health data from the quantum random number generator 112 via the secure health IO data bus 210, and monitors the entropy source performance associated with generating the quantum random numbers for the hardware devices in the computing device. Similarly, the embedded secure element 308 implemented in the computing device 302 receives health data from the quantum random number generator 312 via the secure health IO data bus 408, and monitors the entropy source performance associated with generating the quantum random numbers for the hardware devices in the computing device.

At 512, an operation health status of the quantum random number generator is determined by the embedded secure element based on the monitored entropy source performance. For example, the embedded secure element 108 implemented in the computing device 102 determines the operation health status of the quantum random number generator 112 based on the monitored entropy source performance of the quantum random number generator. The embedded secure element 108 determines the operation health status of the quantum random number generator 112 to ensure that the integrity of the quantum safe system is maintained, the distribution of the generated quantum random numbers is within health bounds, and ensuring the entropy is correct for the cryptographic applications. Similarly, the embedded secure element 308 implemented in the computing device 302 determines the operation health status of the quantum random number generator 312 based on the monitored entropy source performance of the quantum random number generator.

Figure 6:
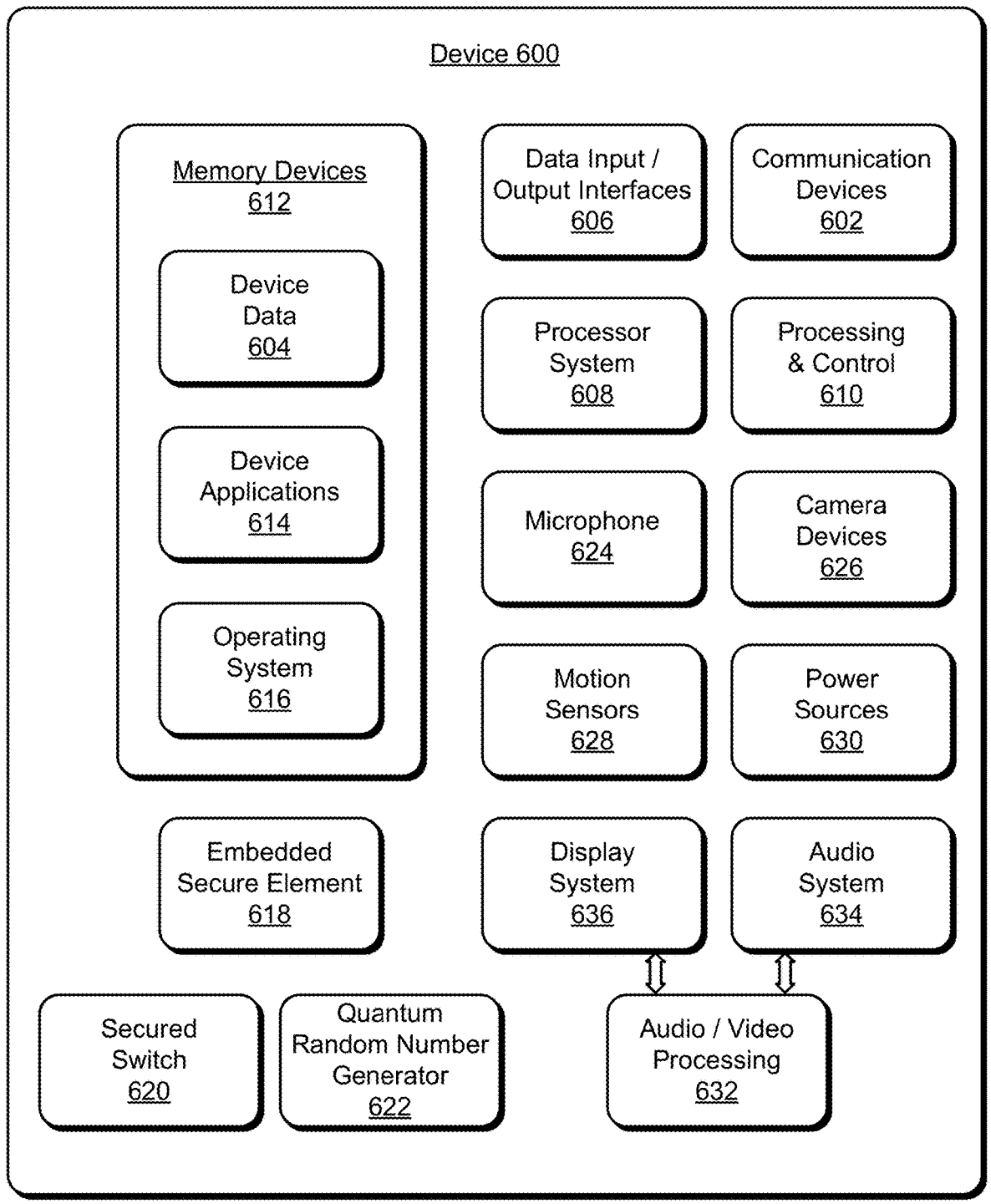
FIG. 6 illustrates various components of an example device that can be used to implement the techniques of quantum-based security for hardware devices as described herein.

FIG. 6 illustrates various components of an example device 600, which can implement aspects of the techniques and features for quantum-based security for hardware devices, as described herein. The example device 600 can be implemented as any of the devices described with reference to the previous FIGS. 1-5, such as any type of a wireless device, mobile device, mobile phone, flip phone, client device, companion device, paired device, display device, tablet, computing, communication, entertainment, gaming, media playback, and/or any other type of computing and/or electronic device. For example, the computing devices 102, 302 described with reference to FIGS. 1-5 may be implemented as the example device 600.

The example device 600 can include various, different communication devices 602 that enable wired and/or wireless communication of device data 604 with other devices. As described herein, a communication device 602 may be implemented as any of the communication components implemented in a computing device, such as a near field communication (NFC) controller, an ultra-wideband (UWB) controller, a stand-alone subscriber identity module (SIM), a stand-alone electronic subscriber identity module (eSIM), and/or a secure element integrated with SIM/eSIM capabilities, such as implemented in the computing devices 102, 302. The device data 604 can include any of the various devices data and content that is generated, processed, determined, received, stored, and/or transferred from one computing device to another, and/or synched between multiple computing devices. Generally, the device data 604 can include any form of audio, video, image, graphics, and/or electronic data that is generated by applications executing on a device. The communication devices 602 can also include transceivers for cellular phone communication and/or for any type of network data communication.

The example device 600 can also include various, different types of data input/output (I/O) interfaces 606, such as data network interfaces that provide connection and/or communication links between the devices, data networks, and other devices. The I/O interfaces 606 can be used to couple the device to any type of components, peripherals, and/or accessory devices, such as a computer input device that may be integrated with the example device 600. The I/O interfaces 606 may also include data input ports via which any type of data, information, media content, communications, messages, and/or inputs can be received, such as user inputs to the device, as well as any type of audio, video, image, graphics, and/or electronic data received from any content and/or data source.

The example device 600 includes a processor system 608 of one or more processors (e.g., any of microprocessors, controllers, and the like) and/or a processor and memory system implemented as a system-on-chip (SoC) that processes computer-executable instructions. The processor system may be implemented at least partially in computer hardware, which can include components of an integrated circuit or on-chip system, an application-specific integrated circuit (ASIC), a field-programmable gate array (FPGA), a complex programmable logic device (CPLD), and other implementations in silicon and/or other hardware. The processor system 608 may also incorporate and utilize a trusted execution environment, such as the trusted execution environment 106 of the processor 104 in the computing device 102, or the trusted execution environment 306 of the processor 304 in the computing device 302. Alternatively or in addition, the example device 600 can be implemented with any one or combination of software, hardware, firmware, or fixed logic circuitry that may be implemented in connection with processing and control circuits, which are generally identified at 610.

The example device 600 may also include any type of a system bus or other data and command transfer system that couples the various components within the device. A system bus can include any one or combination of different bus structures and architectures, as well as control and data lines. For example, the described computing devices 102, 302 include any one or more of the secure data buses for data transfer of the generated quantum random numbers from the secure switch 114 and/or from the embedded secure element 308 via the virtualized secure switch 314 to the hardware devices that are the tamper-resistant components implemented in the computing devices.

The example device 600 also includes memory and/or memory devices 612 (e.g., computer-readable storage memory) that enable data storage, such as data storage devices implemented in hardware that can be accessed by a computing device, and that provide persistent storage of data and executable instructions (e.g., software applications, programs, functions, and the like). Examples of the memory devices 612 include volatile memory and non-volatile memory, fixed and removable media devices, and any suitable memory device or electronic data storage that maintains data for computing device access. The memory devices 612 can include various implementations of random-access memory (RAM), read-only memory (ROM), flash memory, and other types of storage media in various memory device configurations. The example device 600 may also include a mass storage media device.

The memory devices 612 (e.g., as computer-readable storage memory) provide data storage mechanisms, such as to store the device data 604, other types of information and/or electronic data, and various device applications 614 (e.g., software applications and/or modules). For example, an operating system 616 can be maintained as software instructions with a memory device and executed by the processor system 608 as a software application. The device applications 614 may also include a device manager, such as any form of a control application, software application, signal-processing and control module, code that is specific to a particular device, a hardware abstraction layer for a particular device, and so on.

In this example, the device 600 also includes the device components to implement the various aspects of the described features and techniques for quantum-based security for hardware devices, such as an embedded secure element 618, a secured switch 620, and a quantum random number generator 622. The components can be implemented with hardware components and/or in software, such as when the example device 600 is implemented as the computing devices 102, 302 described with reference to FIGS. 1-5.

The example device 600 can also include a microphone 624 and/or camera devices 626, as well as motion sensors 628, such as may be implemented as components of an inertial measurement unit (IMU). The motion sensors 628 can be implemented with various sensors, such as a gyroscope, an accelerometer, and/or other types of motion sensors to sense motion of the device. The motion sensors 628 can generate sensor data vectors having three-dimensional parameters (e.g., rotational vectors in x, y, and z-axis coordinates) indicating location, position, acceleration, rotational speed, and/or orientation of the device. The example device 600 can also include one or more power sources 630, such as when the device is implemented as a wireless device and/or mobile device. The power sources may include a charging and/or power system, and can be implemented as a flexible strip battery, a rechargeable battery, a charged super-capacitor, and/or any other type of active or passive power source.

The example device 600 can also include an audio and/or video processing system 632 that generates audio data for an audio system 634 and/or generates display data for a display system 636. The audio system and/or the display system may include any types of devices or modules that generate, process, display, and/or otherwise render audio, video, display, and/or image data. Display data and audio signals can be communicated to an audio component and/or to a display component via any type of audio and/or video connection or data link. In implementations, the audio system and/or the display system are integrated components of the example device 600. Alternatively, the audio system and/or the display system are external, peripheral components to the example device.

Although implementations of quantum-based security for hardware devices have been described in language specific to features and/or methods, the appended claims are not necessarily limited to the specific features or methods described. Rather, the specific features and methods are disclosed as example implementations of quantum-based security for hardware devices, and other equivalent features and methods are intended to be within the scope of the appended claims. Further, various different examples are described and it is to be appreciated that each described example can be implemented independently or in connection with one or more other described examples. Additional aspects of the techniques, features, and/or methods discussed herein relate to one or more of the following:

A computing device, comprising: a processor configured for application processing in a trusted execution environment; a quantum random number generator configured to generate quantum random numbers sourced by multiple hardware devices in the computing device; and an embedded secure element configured to manage connection security of the multiple hardware devices as a secure controller of the quantum random number generator.

Alternatively or in addition to the above described computing device, any one or combination of: the embedded secure element is a single root of trust as the secure controller of the quantum random number generator. The embedded secure element is configured to monitor entropy source performance associated with generating the quantum random numbers, and determine an operation health status of the quantum random number generator based on the monitored entropy source performance. The multiple hardware devices are tamper-resistant components that include at least the processor and the embedded secure element. The multiple hardware devices are tamper-resistant components that include at least the processor and an integrated circuit that incorporates the embedded secure element. The computing device further comprising a secure switch controlled by the embedded secure element, the secure switch being switchable to connect at least one of the multiple hardware devices to obtain a quantum random number from the quantum random number generator. The at least one hardware device receives the quantum random number generated by the quantum random number generator via a secure data bus that connects the at least one hardware device to the secure switch. The computing device further comprising a virtualized secure switch implemented in the embedded secure element, the virtualized secure switch being switchable to connect at least one of the multiple hardware devices to obtain a quantum random number from the quantum random number generator. The at least one hardware device receives the quantum random number that is passed through the embedded secure element and via a secure data bus that connects the at least one hardware device to the embedded secure element.

A computing device, comprising: a processor configured for application processing in a trusted execution environment; a quantum random number generator configured to generate quantum random numbers sourced by multiple hardware devices in the computing device; and a secure switch controlled by an embedded secure element that manages connection security of the multiple hardware devices, the secure switch being switchable to connect at least one of the multiple hardware devices to obtain a quantum random number from the quantum random number generator.

Alternatively or in addition to the above described computing device, any one or combination of: the embedded secure element is a single root of trust as a secure controller of the secure switch to manage access to the quantum random number generator by the multiple hardware devices. The embedded secure element is configured to monitor entropy source performance associated with generating the quantum random numbers, and determine an operation health status of the quantum random number generator based on the monitored entropy source performance. The multiple hardware devices are tamper-resistant components that include at least the processor and the embedded secure element. The multiple hardware devices are tamper-resistant components that include at least the processor and an integrated circuit that incorporates the embedded secure element. The at least one hardware device receives the quantum random number generated by the quantum random number generator via a secure data bus that connects the at least one hardware device to the secure switch. The secure switch is a virtualized secure switch implemented in the embedded secure element, and the at least one hardware device receives the quantum random number that is passed through the embedded secure element and via a secure data bus that connects the at least one hardware device to the embedded secure element.

A method, comprising: generating quantum random numbers by a quantum random number generator that is sourced by multiple hardware devices in a computing device; managing connection security of the multiple hardware devices by an embedded secure element that is operational as a secure controller of the quantum random number generator; and switching a secure switch by the embedded secure element to connect at least one of the multiple hardware devices that requests a quantum random number from the quantum random number generator.

Alternatively or in addition to the above described method, any one or combination of: the embedded secure element is a single root of trust as the secure controller of the secure switch to manage access to the quantum random number generator by the multiple hardware devices. The method further comprising monitoring entropy source performance associated with the generating the quantum random numbers, and determining an operation health status of the quantum random number generator by the embedded secure element based on the monitored entropy source performance. The secure switch is a virtualized secure switch implemented in the embedded secure element.

The invention claimed is:

1. A computing device, comprising:
   a processor configured for application processing in a trusted execution environment;
   a quantum random number generator configured to generate quantum random numbers sourced by multiple hardware devices in the computing device; and
   an embedded secure element configured to manage connection security of the multiple hardware devices as a secure controller of the quantum random number generator, and monitor entropy source performance associated with generating the quantum random numbers.

2. The computing device of claim 1, wherein the embedded secure element is a single root of trust as the secure controller of the quantum random number generator.

3. The computing device of claim 1, wherein the embedded secure element is configured to determine an operation health status of the quantum random number generator based on the monitored entropy source performance.

4. The computing device of claim 1, wherein the multiple hardware devices are tamper-resistant components that include at least the processor and the embedded secure element.

5. The computing device of claim 1, wherein the multiple hardware devices are tamper-resistant components that include at least the processor and an integrated circuit that incorporates the embedded secure element.

6. The computing device of claim 1, further comprising a secure switch controlled by the embedded secure element, the secure switch being switchable to connect at least one of the multiple hardware devices to obtain a quantum random number from the quantum random number generator.

7. The computing device of claim 6, wherein the at least one hardware device receives the quantum random number generated by the quantum random number generator via a secure data bus that connects the at least one hardware device to the secure switch.

8. The computing device of claim 1, further comprising a virtualized secure switch implemented in the embedded secure element, the virtualized secure switch being switchable to connect at least one of the multiple hardware devices to obtain a quantum random number from the quantum random number generator.

9. The computing device of claim 8, wherein the at least one hardware device receives the quantum random number that is passed through the embedded secure element and via a secure data bus that connects the at least one hardware device to the embedded secure element.

10. A computing device, comprising:
    a processor configured for application processing in a trusted execution environment;
    a quantum random number generator configured to generate quantum random numbers sourced by multiple hardware devices in the computing device; and
    a secure switch controlled by an embedded secure element that manages connection security of the multiple hardware devices and monitors entropy source performance associated with generating the quantum random numbers, the secure switch being switchable to connect at least one of the multiple hardware devices to obtain a quantum random number from the quantum random number generator.

11. The computing device of claim 10, wherein the embedded secure element is a single root of trust as a secure controller of the secure switch to manage access to the quantum random number generator by the multiple hardware devices.

12. The computing device of claim 10, wherein the embedded secure element is configured to determine an operation health status of the quantum random number generator based on the monitored entropy source performance.

13. The computing device of claim 10, wherein the multiple hardware devices are tamper-resistant components that include at least the processor and the embedded secure element.

14. The computing device of claim 10, wherein the multiple hardware devices are tamper-resistant components that include at least the processor and an integrated circuit that incorporates the embedded secure element.

15. The computing device of claim 10, wherein the at least one hardware device receives the quantum random number generated by the quantum random number generator via a secure data bus that connects the at least one hardware device to the secure switch.

16. The computing device of claim 10, wherein:
the secure switch is a virtualized secure switch implemented in the embedded secure element; and
the at least one hardware device receives the quantum random number that is passed through the embedded secure element and via a secure data bus that connects the at least one hardware device to the embedded secure element.

17. A method, comprising:
generating quantum random numbers by a quantum random number generator that is sourced by multiple hardware devices in a computing device;
managing connection security of the multiple hardware devices by an embedded secure element that is operational as a secure controller of the quantum random number generator;
switching a secure switch by the embedded secure element to connect at least one of the multiple hardware devices that requests a quantum random number from the quantum random number generator; and
monitoring entropy source performance associated with generating the quantum random numbers.

18. The method of claim 17, wherein the embedded secure element is a single root of trust as the secure controller of the secure switch to manage access to the quantum random number generator by the multiple hardware devices.

19. The method of claim 17, further comprising:
determining an operation health status of the quantum random number generator by the embedded secure element based on the monitored entropy source performance.

20. The method of claim 17, wherein the secure switch is a virtualized secure switch implemented in the embedded secure element.

* * * * *